US011324167B2

(12) United States Patent
Le Nevé et al.

(10) Patent No.: US 11,324,167 B2
(45) Date of Patent: May 10, 2022

(54) HARVESTING MACHINE COMPRISING A HARVESTING UNIT AND A SYSTEM FOR RECOVERING THE CROP DETACHED BY SAID HARVESTING UNIT

(71) Applicant: CNH Industrial America LLC, New Holland, PA (US)

(72) Inventors: Daniel H. A. M. Le Nevé, Challans (FR); Guillaume Supiot, Aizenay (FR)

(73) Assignee: CNH Industrial America LLC, New Holland, PA (US)

( * ) Notice: Subject to any disclaimer, the term of this patent is extended or adjusted under 35 U.S.C. 154(b) by 230 days.

(21) Appl. No.: 16/465,898

(22) PCT Filed: Dec. 1, 2017

(86) PCT No.: PCT/EP2017/081277
§ 371 (c)(1),
(2) Date: May 31, 2019

(87) PCT Pub. No.: WO2018/100199
PCT Pub. Date: Jun. 7, 2018

(65) Prior Publication Data
US 2019/0307073 A1    Oct. 10, 2019

(30) Foreign Application Priority Data
Dec. 2, 2016    (EP) .................................... 16306610

(51) Int. Cl.
*A01D 46/28*    (2006.01)
(52) U.S. Cl.
CPC .................................. *A01D 46/285* (2013.01)
(58) Field of Classification Search
CPC .... A01D 46/285; A01D 75/187; A01D 33/02; A01D 33/08; A01D 23/04; A01D 46/28;
(Continued)

(56) References Cited

U.S. PATENT DOCUMENTS

| 2,503,616 A | * | 4/1950 | Hamner | .................. | A01D 46/08 |
| | | | | | 56/30 |
| 2,651,163 A | * | 9/1953 | Aasland | ............... | A01D 45/025 |
| | | | | | 56/107 |

(Continued)

FOREIGN PATENT DOCUMENTS

| DE | 3810610 A1 | * | 10/1989 | ............. | A01D 33/02 |
| EP | 0336075 A1 | * | 10/1989 | ............. | A01D 33/02 |

(Continued)

OTHER PUBLICATIONS

PCT International Search Report for PCT application PCT/EP2017/081277, dated Mar. 1, 2018 (10 pages).

(Continued)

*Primary Examiner* — Thomas B Will
*Assistant Examiner* — Madeline I Runco
(74) *Attorney, Agent, or Firm* — Peter Zacharias; Patrick Sheldrake

(57) ABSTRACT

A harvesting machine including a harvesting unit and a system for recovering crop detached by the harvesting unit. The recovering system including at least one conveyor adapted to recover the crop detached by the harvesting unit and to convey the crop along a conveying path. The recovering system comprising a removing device for removing debris elements that might be conveyed with the detached crop. The removing device including two rotary organs which form therebetween a mouth that is adjacent to the conveying path to be able to catch debris elements protruding from the conveyor. The mouth converging into an inner gripping zone formed by a narrow gap between the rotary organs. The removing device further including a drive unit for the rotation of at least one of the two rotary organs to extract from the conveyor any debris element caught by the mouth and then gripped between the rotary organs.

18 Claims, 3 Drawing Sheets

(58) Field of Classification Search
CPC .............. A23N 15/025; B65G 17/126; B65G 2201/0211; B65G 47/40; B65G 17/26; B65G 17/36; B65G 17/16; A01G 17/02
See application file for complete search history.

(56) References Cited

U.S. PATENT DOCUMENTS

| | | | | | |
|---|---|---|---|---|---|
| 3,361,136 | A * | 1/1968 | Turnbull | ............ | A01D 45/02 460/123 |
| 3,385,042 | A * | 5/1968 | Christie | ............ | A01D 46/28 56/330 |
| 3,435,950 | A * | 4/1969 | Suverkrop | ............ | B07C 5/34 209/557 |
| 3,492,797 | A * | 2/1970 | Sears | ............ | A01D 45/021 56/14.1 |
| 3,606,743 | A * | 9/1971 | Johnson | ............ | A01D 45/021 56/14.2 |
| 3,640,055 | A * | 2/1972 | Looker | ............ | A01D 45/02 56/106 |
| 3,648,443 | A * | 3/1972 | Sears | ............ | A01D 45/021 56/111 |
| 3,894,382 | A * | 7/1975 | Jauss | ............ | A01D 45/021 56/14.3 |
| 3,916,913 | A * | 11/1975 | Looker | ............ | A01D 33/02 460/130 |
| 3,927,680 | A * | 12/1975 | Stefan | ............ | A01D 46/02 460/128 |
| 4,241,569 | A | 12/1980 | Bobard et al. | | |
| 4,524,572 | A * | 6/1985 | Wilde | ............ | A01D 45/008 171/28 |
| 4,999,983 | A * | 3/1991 | Britt | ............ | A01D 45/021 56/107 |
| 5,024,278 | A * | 6/1991 | Shuknecht | ............ | A01D 23/04 171/17 |
| 5,379,579 | A * | 1/1995 | Monahan, Jr. | ............ | A01D 45/00 56/121.46 |
| 5,697,451 | A * | 12/1997 | Nicholson | ............ | A01D 17/06 171/133 |
| 6,105,347 | A * | 8/2000 | Behnke | ............ | A01D 75/187 460/2 |
| 6,430,903 | B1 * | 8/2002 | Christiansen | ............ | A01D 75/187 460/2 |
| 6,843,044 | B2 * | 1/2005 | Clauss | ............ | A01D 41/127 56/10.3 |
| 6,938,403 | B2 * | 9/2005 | Suter | ............ | A01D 46/26 56/328.1 |
| 8,641,495 | B2 * | 2/2014 | Kneppers | ............ | A01D 46/00 460/136 |
| 9,078,468 | B2 * | 7/2015 | Barajas | ............ | A23N 15/00 |
| 9,247,768 | B2 * | 2/2016 | Pellenc | ............ | A23N 15/025 |
| 2009/0057208 | A1 * | 3/2009 | Pellenc | ............ | A23N 15/02 209/606 |
| 2010/0096301 | A1 * | 4/2010 | Nyborg | ............ | B07B 13/10 209/667 |
| 2010/0132326 | A1 * | 6/2010 | Berthet | ............ | A23N 15/02 56/328.1 |

FOREIGN PATENT DOCUMENTS

| | | | | |
|---|---|---|---|---|
| EP | 0945050 | A1 * | 9/1999 | ............ A01D 33/02 |
| EP | 1591001 | A1 * | 11/2005 | ............ A01D 33/10 |
| EP | 2385754 | B1 | 3/2013 | |
| EP | 2677853 | B1 | 6/2016 | |
| FR | 2399793 | A1 | 3/1979 | |

OTHER PUBLICATIONS

Extended European Search Report for EP application 16306610.3, dated Jun. 13, 2017 (5 pages).

* cited by examiner

HARVESTING MACHINE COMPRISING A HARVESTING UNIT AND A SYSTEM FOR RECOVERING THE CROP DETACHED BY SAID HARVESTING UNIT

TECHNICAL FIELD

The invention relates to a harvesting machine comprising a harvesting unit and a system for recovering the crop detached by said harvesting unit.

The invention applies in particular to the technical domain of mechanical harvesting of fruits growing on plants, such as trees or bushes, that are arranged in rows, such as grapes, berries, coffee beans, olives etc., and in particular fruits growing in bunches.

BACKGROUND ART

Fruits are conventionally harvested by a harvesting machine comprising a motorised support structure which is movable along rows of plants, a harvesting unit being mounted on said structure for straddling at least one of said rows of plants and harvesting fruits from said row. To that end, the harvesting unit includes a straddling chassis which delimits a harvesting tunnel into which the plants are successively introduced to move through said tunnel between respective openings at the front and at the rear of said tunnel.

To detach the fruit from the plants, a particular harvesting unit may include a shaker system including two shaker devices, said shaker devices being arranged on respective sides of the harvesting tunnel to delimit said tunnel transversely.

The harvesting machine further includes a system for recovering the crop detached by the harvesting unit, which enables, possibly after cleaning and/or sorting, the storage thereof in at least one hopper provided for that purpose on the harvesting machine or in an ancillary trailer.

To that end, the recovering system may comprise at least one conveyor adapted to recover the crop detached by the harvesting unit and to convey said crop along a conveying path of said system, said path leading to cleaning and/or sorting systems, or directly to storage systems that can be provided on the harvesting machine.

In particular, the recovering system can comprise two conveyors that are mounted respectively on each transverse side of the harvesting tunnel, each conveyor having a conveying path that is configured to recover the detached crop underneath the harvesting unit and to convey said crop onto the upper part of the harvesting machine, wherein cleaning, sorting and/or storing systems may be provided.

Some fruits, such as grapes, berries, coffee beans or olives, are generally cultivated in geographical regions wherein the climate is relatively hot, in particular during the summer season, because these climatic conditions are the most favourable for their maturation, and thus guarantee a better quality of the crop.

Furthermore, in these regions, farmers generally let the plants with a lot of branches and/or leaves for covering the fruits and acting as a canopy of natural sun protectors, as a direct exposure of said fruits to the solar radiations may greatly affect the quality of said fruits, especially when these radiations are important.

However, this abundant vegetation may cause some problems during the harvest, as some parts of it, notably branches, may be detached along with the fruits by the harvesting unit, and they may be recovered and conveyed with said fruits by the recovering system. Moreover, other types of debris, such as for example pieces of a pole and/or of iron wire supporting the plants, may also be detached, recovered and conveyed with the fruits. Generally, the term "debris" as used herein refers to material other than fruits that is detached during the harvesting operation and is received together with the fruits by the recovering system.

In particular, some elements of these debris may present relatively great dimensions, notably the branches, which can for example present a length comprised between around 50 cm and 2 m and/or a diameter of around 10 mm, whereas the different systems of the machine, in particular the conveying path of the recovering system, generally present more reduced dimensions, so that, during the operation of the recovering system, these debris elements may be blocked somewhere along the conveying path, which could eventually form jams within said path and then totally block said recovering system.

Thus, during a harvesting procedure, the operator of the machine may be regularly constrained to stop the machine for removing manually the blocked debris elements, which not only diminishes the quality of work and generates significant losses of time, but also threatens the security of the operator. Moreover, the presence of detached debris within the crop may significantly complicate not only the cleaning of said crop, but also the washing and/or the maintenance operations of the machine at the end of the harvesting procedure.

The invention aims to improve the prior art by proposing a harvesting machine which is adapted to limit the jamming of said machine, and notably of the crop recovering system, with debris elements that might be recovered with the crop detached by the harvesting unit.

SUMMARY OF THE INVENTION

For that purpose, the invention relates to a harvesting machine comprising a harvesting unit and a system for recovering the crop detached by said harvesting unit, said recovering system comprising at least one conveyor adapted to recover the crop detached by the harvesting unit and to convey said crop along a conveying path of said system, the recovering system comprising a removing device for removing debris elements that might be conveyed with the detached crop, said removing device comprising two rotary organs which form therebetween a mouth that is adjacent to the conveying path in order to be able to catch debris elements protruding from the conveyor, said mouth converging into an inner gripping zone formed by a narrow gap between said rotary organs, said removing device further comprising a drive unit for the rotation of at least one of the two rotary organs in order to extract from the conveyor any debris element caught by the mouth and then gripped between said rotary organs.

BRIEF DESCRIPTION OF THE DRAWINGS

Other aspects and advantages of the invention will become apparent in the following description made with reference to the appended figures, wherein.

DETAILED DESCRIPTION OF EMBODIMENTS OF THE INVENTION

Figure 1:
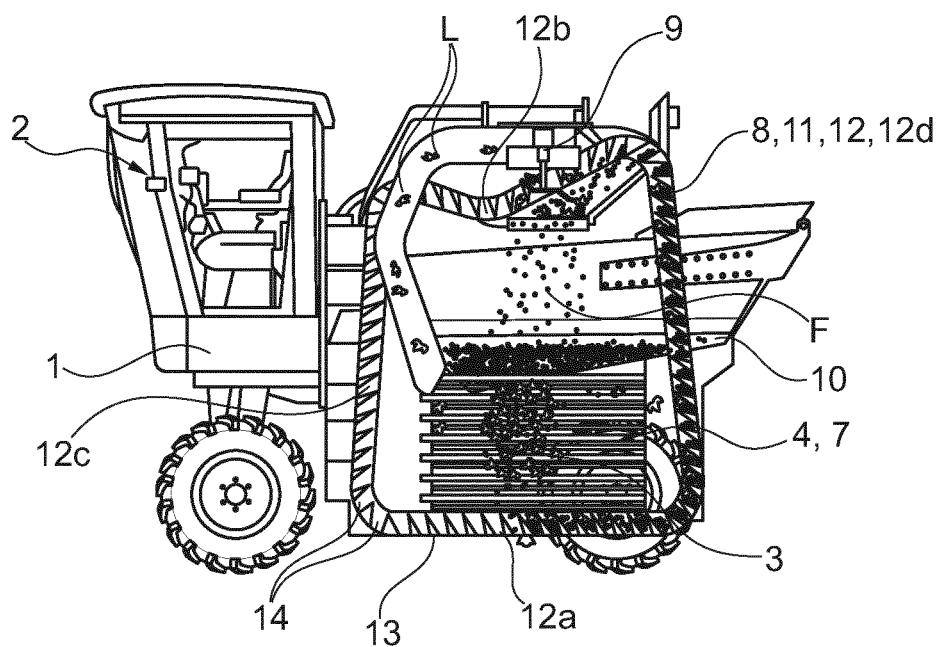
FIG. 1 represents in a side view a harvesting machine according to the invention, with a partial cross-section showing the recovering system.

In relation to these figures, we describe below a harvesting machine comprising a harvesting unit and a system for recovering the crop detached by said harvesting unit.

The harvesting machine is in particular configured for the mechanical harvesting of fruits growing on plants, such as trees or bushes, that are arranged in rows, such as grapes, berries, coffee beans, olives etc., and in particular fruits growing in bunches.

To do so, the harvesting machine comprises a motorized support structure 1 that is equipped with a driver station 2 and that is movable along rows of plants 3, a harvesting unit 4 being mounted on said structure for straddling at least one of said rows of plants and detaching fruits F from said plants.

In particular, the harvesting unit 4 can be mounted on the support structure 1 permanently or removably, so as to be replaceable by other equipment and accessories, for example spraying equipment, pruning equipment or equipment for working the soil.

The harvesting unit 4 includes a straddling chassis 5 which delimits a harvesting tunnel 6 into which the plants 3 are successively introduced to move through said tunnel between respective openings at the front and at the rear of said tunnel. Moreover, the harvesting unit 4 includes a shaker system including two shaker devices 7, said shaker devices being arranged on respective sides of the harvesting tunnel 6 to delimit said tunnel transversely.

The harvesting machine also includes a system 8 for recovering the crop detached by the harvesting unit 4 and a system 9 for cleaning and/or sorting said detached crop to eliminate components L other than fruits F, in particular leaves, leaf stalks and wood particles, before the storage of said harvest in at least one hopper 10 provided for that purpose on the harvesting machine or in an ancillary trailer.

The recovering system 8 comprises at least one conveyor 11 adapted to recover the crop detached by the harvesting unit and to convey said crop along a conveying path 12 of said system, said path leading notably to cleaning and/or sorting system(s) 9 and/or directly to storing hopper(s) 10 provided on the harvesting machine.

Figure 2:
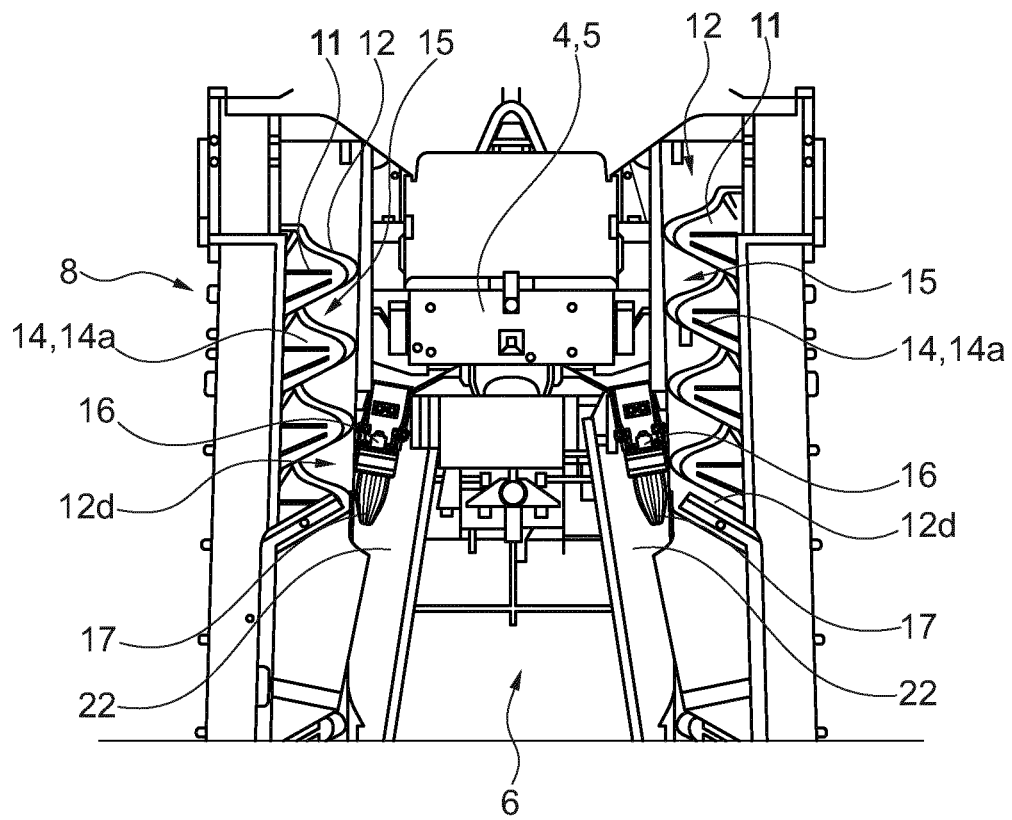
FIG. 2 represents partially in a rear view the harvesting machine of FIG. 1.

In relation to FIGS. 1 and 2, the recovery system 8 comprises two bucket conveyors 11 that are arranged on respective transverse sides of the harvesting tunnel 6, said conveyors being adapted to recover the detached crop underneath the harvesting unit 4 and to convey said crop onto the upper part of the harvesting machine, wherein a cleaning/sorting system 9 and at least one storing hopper 10 are mounted.

In the embodiment shown, each conveyor 11 has a conveying path 12 in the form of a closed loop with a bottom portion 12a configured for recovering the detached crop by gravity underneath the harvesting unit 4, a top portion 12b for feeding the cleaning/sorting system 9 with said detached crop, and substantially vertical intermediate front 12c and rear 12d portions which extend respectively between the front and rear ends of said top and bottom portions.

Each conveyor 11 comprises an elongated traction member 13, such as a chain or a belt, and a plurality of buckets 14 that are arranged in a row on said traction member for forming a continuous conveying path 12 on said traction member, each bucket 14 comprising a flexible body made from a flexible polymeric material, in particular based on polyurethane, so as to ensure soft contact with the plants 3.

Each bucket 14 may comprise a bottom wall which is secured to the traction member 13, for example by means of bolts and nuts, a pair of opposite walls which are intended to extend transversely to the moving direction d of the conveying path 12, and a pair of opposite side walls 14a which integrally connect said transverse walls at opposite sides to each other, said transverse walls and side walls being all integrally connected to the bottom wall.

Advantageously, as described in document FR-2 399 793, the two conveyors 11 may be mounted on the support structure 1 so that their respective bottom conveying path portions 12a are adjacent to one another and guided on either side of a row of plants 3 which moves across the harvesting tunnel 6, so as to clamp said plants of said row at the lower portion of the stem thereof, so that the fruits F detached from said plants would fall directly by gravity into the bottom path portions 12a.

Figure 3A:
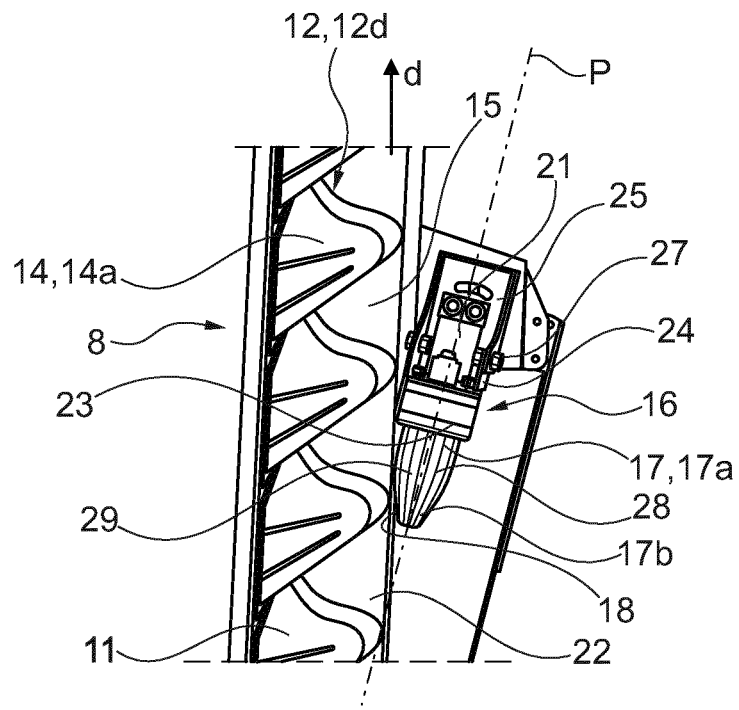
FIGS. 3a and 3b are enlarged view of FIG. 2, respectively in a rear view (FIG. 3a) and in a perspective view (FIG. 3b)

Moreover, the respective buckets 14 of the conveyors 11 may be arranged to form conveying paths 12 that are arranged to imbricate into one another in at least the zone of the bottom path portions 12a, so as to ensure a sealing between said conveyors at said imbrication zone. To do so, as represented notably on FIGS. 2, 3, the respective buckets 14 of each conveyor 11 comprise a beak-shaped side wall 14a which is arranged facing the interior of the harvesting tunnel 6.

In particular, each beak-shaped side wall 14a of a conveyor 11 is intended to closely engage within a complementary space 15 formed between two adjacent beak-shaped side walls 14a of the other conveyor 11 at the zone of the bottom path portions 12a for preventing any clearance between conveyors 11 at said bottom path portions, and then to prevent the risk of crop products F dropping through such clearances.

In the same way, each bucket 14 of a conveyor 11 may be associated at its transverse walls to flexible transverse walls of adjacent buckets 14 in the row, so as to ensure a maximum sealing of the conveying path 12 of said conveyor for receiving all the detached crop products F without ground losses.

Thus, during a harvesting procedure, the harvesting machine is driven by an operator sitting in the driver station 2 to be moved along rows of plants 3, so that said plants are successively introduced within the harvesting tunnel 6 to be shaken by the shaker devices 7, the conveyors 11 continuously recovering the crop F detached from said shaken plants to convey said crop along their respective conveying paths 12 to upper cleaning/sorting system 9 and to storing hopper 10.

However, the shaker devices 7 can also produce debris that may be recovered with the detached crop products F, such as for example vegetal debris like branches and/or leaves of the shaken plants 3, or other types of debris such as for examples pieces of a pole and/or of iron wire supporting said plants. In particular, when such debris elements present great dimensions, which can be notably the case for plant branches, they can protrude from the conveyors 11, and thus may be blocked somewhere along the conveying path 12, which could eventually form jams within said path and then block the recovering system 8.

To avoid such a drawback, the recovering system 8 comprises a removing device 16 for removing debris elements that might be conveyed with the detached crop F. In relation to FIG. 2, both conveyors 11 of the recovering system 8 have a conveying path 12 that is equipped with a removing device 16 for removing debris elements from said path. In particular, the removing devices 16 are arranged at respective rear vertical portions 12d of the paths 12, so as to be placed closer to the recovering bottom portion 12a, which allows to avoid the jamming of the downstream part of the recovering system 8.

Each removing device 16 comprises two rotary organs 17 which form therebetween a mouth 18 that is adjacent to the conveying path 12 in order to be able to catch debris elements protruding from the conveyor 11, said mouth converging, especially in the direction d of the conveying path 12, into an inner gripping zone 19 formed by a narrow gap 20 between the rotary organs 17. Moreover, each removing device 16 further comprises a drive unit 21 for the rotation of at least one of the two rotary organs 17 in order to extract from the conveyor 11 any debris element caught by the mouth 18 and then gripped between said rotary organs.

The harvesting machine may comprise a wall 22 which is disposed alongside a part of the adjacent conveying path 12 in order to cover at least a part of the conveyor 11, notably by facing the openings of the row of buckets 14 of said conveyor, so as to close off said openings, the catching mouth 18 of the recovering device 16 being disposed next to said wall. In particular, the wall 22 may be arranged to form with said conveyor a clearance 30 with the conveyor 11, the catching mouth 18 being disposed next to said clearance. Moreover, the rotary organs 17 of the removing device 16 may be arranged on opposite sides of the plane extending from the wall 22.

Figure 3B:
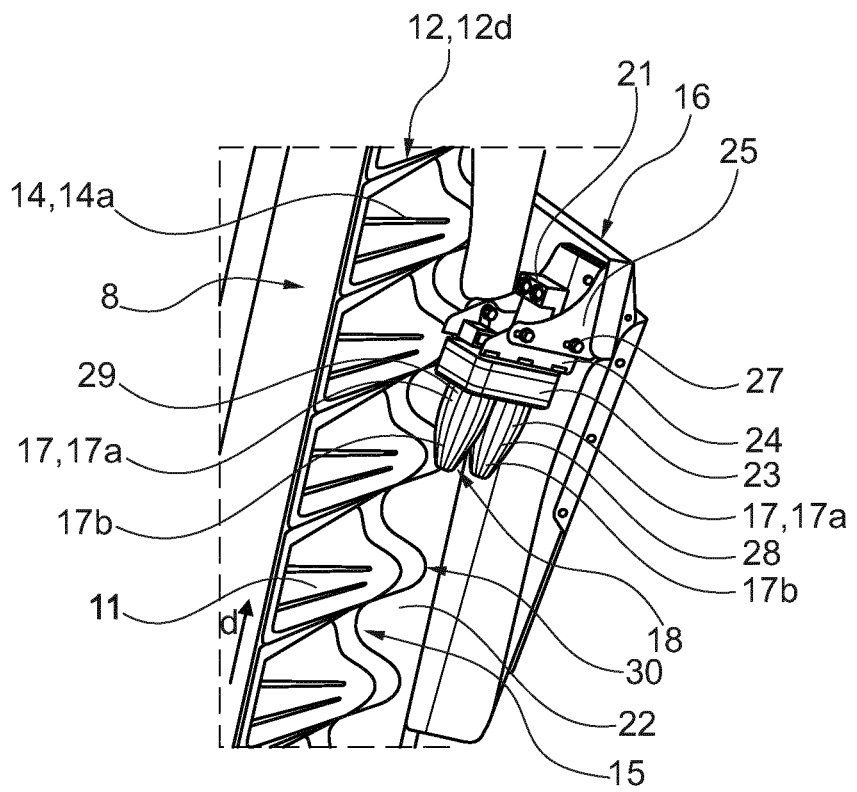

In relation to FIGS. 2 and 3, the harvesting machine comprises two walls 22 which are disposed alongside the rear vertical path portion 12d of respectively one conveying path 12 in order to cover a part of the corresponding conveyor 11 and to form with said conveyor a clearance 30 on the lateral inner side of its conveying path 12, which is facing the interior of the harvesting tunnel 6. Moreover, each removing device 16 is fixed on the corresponding wall 22 so that the catching mouth 18 thereof is disposed next to this clearance 30.

Thus, during the conveying of a detached crop by the conveyors 11, debris elements that may protrude from said conveyors are partially guided by the walls 22 to be oriented towards the inner lateral clearance 30, and then towards the catching mouth 18, said walls notably preventing said debris elements to extend towards the inside of the path 12.

In particular, each removing device 16 comprises a plate 23 on which the rotary organs 17 are rotatably mounted, said plate being fixed on a wall 22 with a possibility to adjust at least one orientation of said rotary organs relatively of the corresponding conveying path 12.

In relation to the figures, the plate 23 comprises a lower and an upper platform on which the rotary organs 17 and the drive unit 21 are respectively mounted, such as two lateral flanges 24 for the orientable fixation of the removing device 16 on a dedicated mounting structure 25 provided on a wall 22. In particular, the mounting flanges 24 and/or the mounting structure 25 may comprise elongated and/or arcuate slot(s) 26 wherein a bolt 27 may be selectively tightened to fix the removing device 16 on the wall 22 according to a desired spatial inclination of the rotary organs 17 relatively to the path 12.

In an advantageous manner, a removing device 16 is fixed to a wall 22 so that the rotary organs 17 thereof are arranged next to each other on the lateral inner side of a conveying path 12, so that the mouth 18 extends adjacent to said conveying path on said lateral inner side. In particular, as represented on FIG. 3a, the axes of the rotary organs 17 are arranged in a plane P that extends from the lateral inner side of the adjacent conveying path 12, said plane being inclined in relation to the direction d of said conveying path, so that the mouth 18 is closest to said conveying path.

Thus, the removing devices 16 may be adapted to catch debris elements with a large scale of lengths, and then to remove more efficiently said debris elements from the conveying paths 12.

In relation to the figures, each rotary organ 17 comprises a periphery with a rear cylindrical part 17a and a front tapered path 17b, the inner gripping zone 19 and the catching mouth 18 being formed between respectively by the two cylindrical parts 17a and by the two tapered parts 17b.

Moreover, the periphery of at least one of the two rotary organ 17 may comprise an outer surface adapted to enhance the catching and/or the gripping of a debris elements between the rotary organs 17.

Figure 4A:
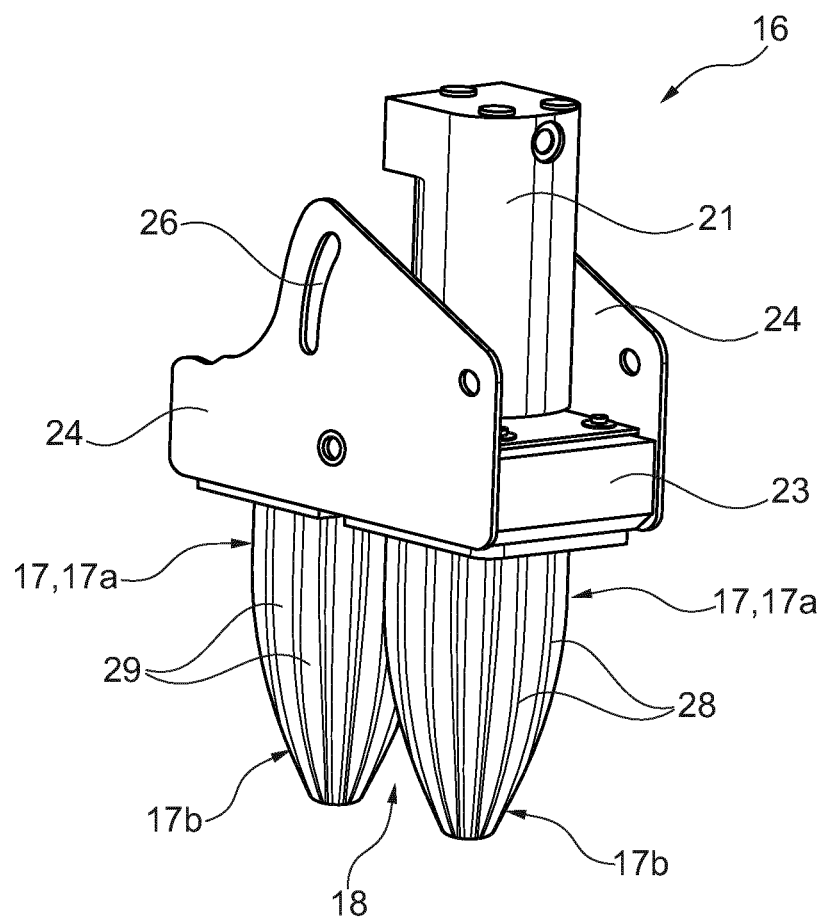
FIGS. 4a and 4b represent the removing device of FIGS. 2, 3, respectively in a perspective view (FIG. 4a) and in a bottom view showing only the rotary organs (FIG. 4b).
Figure 4B:
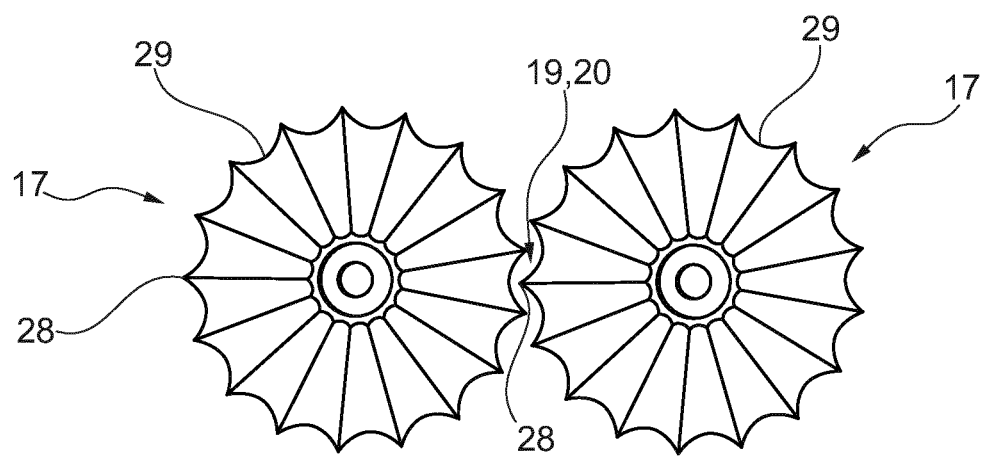

As represented on FIG. 4, the outer surface comprises at least one sharp rib 28 that extends longitudinally on at least a part of the periphery of a rotary organ 17, and more particularly on the whole length of said periphery. In particular, the outer surface comprises an array of tapered sharp ribs 28 which are separated by longitudinal grooves 29, said array extending radially on at least a part of the periphery of a rotary organ 17, and more particularly on the whole radial dimension of said periphery.

In the embodiment shown, the periphery of each rotary organ 17 comprises an array of tapered parallel sharp ribs 28 which are separated by longitudinal grooves 29, the rotary organs 17 being arranged in relation to each other so that, in the gripping zone 19, at least one sharp rib 28 of a rotary organ 17 is disposed in a groove 29 of the other rotary organ 17.

Thus, the rotary organs 17 form a jaw structure at the narrow gap 20 for gripping more easily several types of debris elements, and then for extracting more easily said debris elements from the conveying path 12, by means of the relative rotation of the rotary organs 17 controlled by the drive unit 21 and the consecutive scrolling of the catching and/or gripping ribs 28 and grooves 29.

The drive unit 21 may be in particular configured to rotate the at least one of the two rotary organs 17 so as to scroll the gripping zone 19 in a direction transverse to the direction d of the adjacent conveying path 12, and especially away from said direction d, which allows for scrolling a gripped debris element away from said conveying path, and then facilitates the extraction of said gripped debris element from said conveying path.

The drive units 21 of the two removing devices 16 may be driven synchronously, notably according to the operation status of the harvesting machine. In particular, the machine may comprise means for activating automatically the drive units 21 of the removing devices 16 upon monitoring the activation status of at least one among the harvesting unit 4, the recovering system 8 and the cleaning/sorting system 9, or even upon monitoring the moving speed of the machine. Indeed, the moving speed of the machine can greatly vary whether the machine is performing a harvesting procedure or not, a machine being generally slowly driven along rows of plants for performing such a procedure and more quickly driven on a road between an agricultural field and a farm or between fields.

According to an embodiment, the drive units 21 may be activated upon checking the simultaneous compliance of the machine with several conditions showing the performance of a harvesting procedure, such as for example the activation of the harvesting unit 4, the activation of the recovering system 8, the activation of the cleaning/sorting system 9 and a moving speed of said machine greater than 1.5 km/h.

In particular, the drive units 21 may drive the rotation of the at least one of the two rotary organs 17 at a speed of around 500 revolutions per minute, whereas the moving speed of the machine is around 3.5 km/h, which corresponds notably to an average speed for performing a harvesting procedure in a vineyard with a lot of branches on the plants 3.

Thus, the removing devices 16, by removing protruding debris elements from the conveyors 11, allow for limiting the jamming of said conveyors, and then limit the risks of blocking of said conveyors. This allows the operator to perform a harvesting procedure not only with a better quality of work and limited losses of time, but also with a better security, as said operator is less often constrained to quit the driver station 2 to solve eventual jamming problems on the machine.

Moreover, the removing devices 16 allow for improving the cleaning/sorting operations of the conveyed crop, as they allow to remove a great amount of debris elements from said crop before feeding the cleaning/sorting system 9, which also allows to improve the harvesting yield of the machine.

Besides, by limiting the jamming of the machine, the removing devices 16 also allow to facilitate the final cleaning of the machine at the end of a daily harvesting work and to limit the maintenance operations to perform on said machine, notably by limiting the risks of damage resulting from such jamming on different mechanical parts of the operating systems 4, 7, 8, 9, 11.

However, such debris elements of particularly great dimensions may also be blocked within the removing devices 16, notably at the gripping zone 19 thereof, during their operations, such a blockage may trigger the blockage of the rotation of the at least one rotary organ 17, and then hamper the functioning of the removing device 16.

To avoid such a drawback, the drive units 21 may comprise means, such as for example a rotation speed sensor, for detecting any occurrence of a blockage of the rotation of the at least one rotary organ 17, and means for inversing the rotation direction of said rotary organ upon such a detection, so as to be able to extract any blocking debris element from the gripping zone 19.

For example, the detection means may be adapted to check if the rotation speed of a monitored rotary organ 17 falls below 150 revolutions per minute, so as to detect a blockage in that case and to trigger the launching of a rotation direction inversing procedure, for example for 3 seconds, which is generally sufficient to extract the blocking debris element.

When the at least one rotary organ 17 is driven by means of a hydraulic motor, the occurrence of a blockage may be detected also by monitoring the hydraulic pressure in the line of the hydraulic motor. Alternatively, the rotary organ 17 may be driven by means of an electrical motor and the blockage may be detected by monitoring the motor current. In both cases, a continuous increase of drive power requirements will be indicative of a local build-up of debris elements that may result in a full blocking of the rotary organs 17.

Moreover, the drive units 21 may comprise means for triggering an alarm for the operator, for example through dedicated communication means located within the driver station 2, if the detecting means still detect a blockage after at least one inversion of the rotation direction. For example, the alarm triggering means may be activated after three inversions of the rotation direction, such a number of inversions being generally sufficient to extract a blocking debris element.

The invention claimed is:

1. A harvesting machine comprising:
   a harvesting unit; and
   a recovering system for recovering crop detached by the harvesting unit, the recovering system comprising:
      at least one conveyor adapted to recover the crop detached by the harvesting unit and to convey the crop along a conveying path wherein the conveying path comprises a portion that extends vertically; and
      a removing device for removing debris elements that might be conveyed with the detached crop, the removing device being arranged at the portion that extends vertically only, the removing device comprising:
         two rotary organs which form therebetween a mouth that is closely and directly adjacent to the conveying path in order to be able to catch debris elements protruding from the conveyor, the mouth converging into an inner gripping zone formed by a narrow gap between the rotary organs; and
         a drive unit for the rotation of at least one of the two rotary organs in order to extract from the conveyor any debris element caught by the mouth and then gripped between the rotary organs.

2. The harvesting machine according to claim 1, wherein the rotary organs are arranged next to each other on a lateral side of the conveying path, so that the mouth extends adjacent to the conveying path on the lateral side.

3. The harvesting machine according to claim 1, wherein the axes of the rotary organs are arranged in a plane that extends from the side of the adjacent conveying path.

4. The harvesting machine according to claim 3, wherein the axes of the rotary organs are arranged in a plane that is inclined in relation to a direction of the adjacent conveying path.

5. The harvesting machine according to claim 1, further comprising a wall which is disposed alongside a part of the adjacent conveying path in order to cover at least a part of the at least one conveyor, the mouth being disposed next to the wall.

6. The harvesting machine according to claim 5, wherein the wall is arranged to form a clearance with the at least one conveyor, the catching mouth being disposed next to the clearance.

7. The harvesting machine according to claim 5, wherein the rotary organs are arranged on opposite sides of the plane extending from the wall.

8. The harvesting machine according to claim 7, wherein the removing device comprises a plate on which the rotary organs are rotatably mounted, the plate being fixed on the machine with a possibility to adjust at least one orientation of the organs relatively of the conveying path.

9. The harvesting machine according to claim 1, wherein each rotary organ comprises a periphery with a rear cylindrical part and a front tapered part, the inner gripping zone and the mouth being formed between respectively the two cylindrical parts and the two tapered parts.

10. The harvesting machine according to claim 9, wherein the periphery of at least one of the two rotary organs comprises an outer surface adapted to enhance the catching or the gripping of a debris element between the rotary organs.

11. The harvesting machine according to claim 10, wherein the outer surface comprises at least one sharp rib that extends longitudinally on at least a part of the periphery.

12. The harvesting machine according to claim 11, wherein the outer surface comprises an array of tapered sharp ribs which are separated by longitudinal grooves.

13. The harvesting machine according to claim 12, wherein the periphery of each rotary organ comprises an array of tapered sharp ribs which are separated by longitudinal grooves, the rotary organs being arranged in relation to each other so that, in the gripping zone, at least one sharp rib of one of the rotary organs is disposed in a groove of another of the rotary organs.

14. The harvesting machine according to claim 1, wherein the drive unit is configured to rotate at least one of the rotary organs so as to scroll the gripping zone in a direction transverse to a direction of the adjacent conveying path.

15. The harvesting machine according to claim 1, wherein the drive unit comprises a sensor for detecting any occurrence of a blockage of rotation of at least one of the rotary organs and a reverser for reversing a rotation direction of the rotary organ having the blockage upon such a detection, so as to be able to extract any blocking debris element from the gripping zone.

16. The harvesting machine according to claim 15, wherein the drive unit comprises a trigger for triggering an alarm if the sensor still detects a blockage after at least one reversing of the rotation direction.

17. The harvesting machine according to claim 1, wherein the recovery system comprises two conveyors that are mounted respectively on two opposite sides of the harvesting unit, each conveyor having a conveying path that is equipped with a removing device for removing debris elements from the path.

18. The harvesting machine according to claim 1, wherein it is configured for harvesting grapes.

* * * * *